No. 832,950. PATENTED OCT. 9, 1906.
H. BELL.
VEHICLE WHEEL.
APPLICATION FILED NOV. 7, 1905.
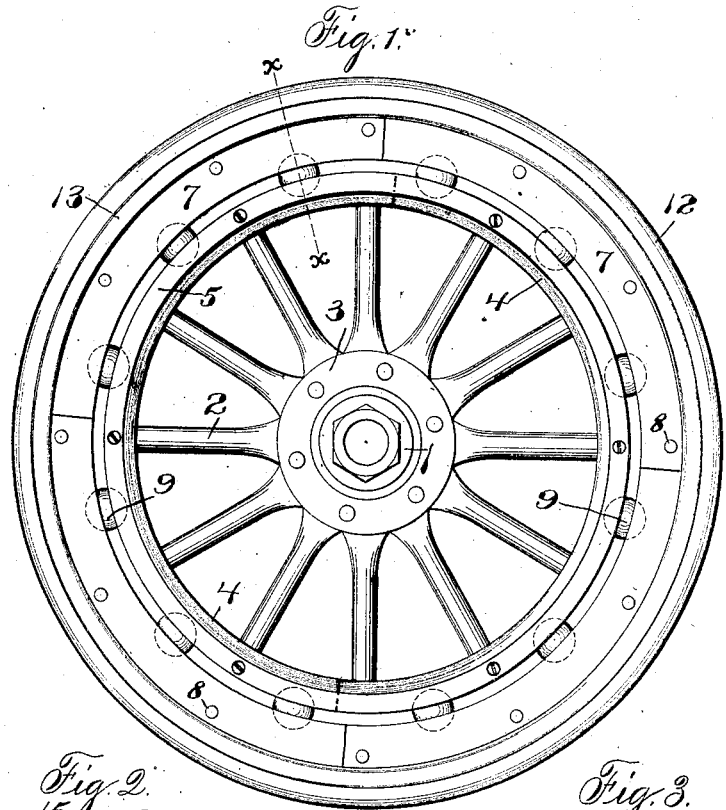
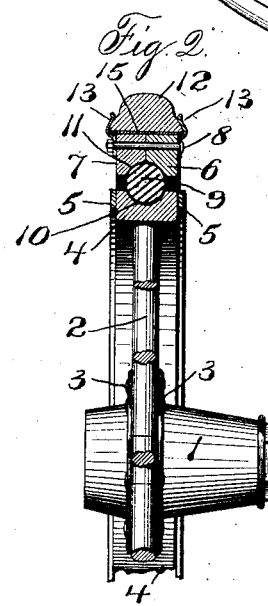
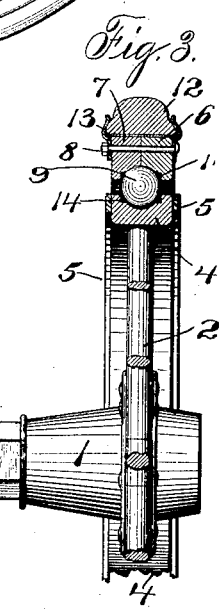
Witnesses:
A. White
J. A. Graves.
Inventor
Harry Bell
by Philipp, Sawyer, Rice & Kennedy
attys

UNITED STATES PATENT OFFICE.

HARRY BELL, OF STAMFORD, CONNECTICUT.

VEHICLE-WHEEL.

No. 832,950.

Specification of Letters Patent.

Patented Oct. 9, 1906.

Application filed November 7, 1905. Serial No. 286,174.

*To all whom it may concern:*

Be it known that I, HARRY BELL, a citizen of the United States, residing at Stamford, county of Fairfield, and State of Connecticut, have invented certain new and useful Improvements in Vehicle-Wheels, fully described and represented in the following specification and the accompanying drawings, forming a part of the same.

The great demand for resilient vehicle-wheels is at the present time almost universally filled by providing wheels with the well-known pneumatic tires. These tires, while giving excellent results, are objectionable, as is well known, not only on account of great initial cost, but on account of lack of durability, because of liability to puncture, and for other reasons.

Many attempts have been made to construct a resilient wheel which will have the practical advantages of the pneumatic tire without being open to its well-known disadvantages. Attempts have been made, for instance, to construct a wheel provided with an outer rim surrounding the felly, there being interposed between the rim and the felly shock-absorbing springs of various kinds intended to permit the rim to yield with respect to the felly as the wheel rotates. Attempts have also been made to construct a wheel having a felly and an outer rim, there being resilient balls located between the rim and the felly, serving the same purpose as springs; but these ball-employing constructions have been impracticable for various reasons. In some of them the ball-retaining construction was not of such a character as to permit the proper construction of the wheel and at the same time retain the outer rim in position thereon. In other proposed constructions the ball-retaining devices have been of such a character as to allow too much circumferential movement of the rim with respect to the felly or else devices were employed for limiting this movement which had serious disadvantages in the construction of the wheel as a whole. Further, these proposed constructions were expensive to build and impractical for that reason.

The present invention has for its object to produce a comparatively inexpensive, simple, and effective wheel of the resilient type in which an outer rim is employed in connection with the felly, the rim being held in position by resilient couplings interposed between it and the felly, the construction being such that the rim is effectively maintained in position by the couplings against the strains incident to running, and at the same time excessive movement in any direction is prevented by the coupling-holding construction.

With this and other objects in view the invention consists in certain constructions and in certain parts, improvements, and combinations, such as will be hereinafter fully described and then specifically pointed out.

Referring to the drawings, Figure 1 is a side elevation of a wheel embodying the improved construction. Fig. 2 is a sectional view of the wheel construction illustrated in Fig. 1, and Fig. 3 is a similar view illustrating a modification.

The wheel which has been selected to illustrate the invention is in its general characteristics of the well-known artillery type. The hub of the wheel is indicated at 1, the spokes at 2, and the usual spoke-holding plates at 3. When a wheel of this type is selected to embody the invention, the felly (indicated at 4) may be of any usual construction. In the best constructions, however, the felly will be held in position on the spokes by suitable retaining devices, such, for instance, as circumferential metal rings 5, which prevent any outward movement of the parts of the felly.

The wheel will be provided with an outer rim which is spaced from the felly to provide for the reception of the coupling devices hereinafter referred to, and the construction will be such that access may be had to the space between the rim and the felly by removing certain parts so that the coupling devices may be inserted. In the construction shown the rim consists generally of two circular parts 6 and 7, these parts, however, being, if desired, made up of independent sections. The parts of the rim will be detachably held together by any suitable means. In the particular construction illustrated bolts 8, which pass through the parts of the felly, are employed for this purpose. In order to secure the necessary resiliency and at the same time to hold the rim in position with respect to the felly, a series of separate elastic connecting devices or couplings are employed, which in the best constructions will be in the shape of balls. In the construction shown solid balls 9 are employed, such balls being cheap to make and while providing for the necessary resiliency are not liable to crack or break in use, as is the case with hollow balls. In the particular construction illustrated the felly is provided with a series of concave recesses 10, which are spaced apart circumferentially, and the rim is provided with similar recesses 11, which when the parts of the wheel are assembled lie opposite the recesses 10, the balls 9 being held in position by opposing recesses. In constructing the particular wheel illustrated it is important that the inner circumference of the outer rim lie so close to the outer circumference of the felly as to make it impossible to remove the balls without separating the parts of the rim. With this construction the strains to which the wheels are subjected in running cannot force the balls or couplings out of the recesses, and there is therefore no chance that the rim can become separated from the felly, so that the balls or couplings may be relied upon as the sole means for connecting the felly and rim.

By spacing the separate elastic couplings proper distances apart and by holding them properly these couplings will, if properly constructed, allow the rim to have the necessary movements to make the wheel resilient and at the same time will prevent excessive movements. It is not necessary, therefore, to employ stops to prevent excessive circumferential movement, which stops in order to be effective have to be very strongly made, especially on heavy vehicles, such as motor-cars, and which are difficult to secure in position without weakening the felly and rim.

In order to secure proper traction, the rim may be provided with a suitable outer tire. In the construction illustrated a solid or cushion tire is indicated at 12, this tire being held in position by clencher-rings 13. Under ordinary circumstances and when balls are employed the ball-holding recesses will have the shape of segments of a sphere the diameter of which is such as to cause the balls to snugly fit in the recesses, each recess enveloping somewhat less than one-half the circumference of the ball. If it be desired, however, to increase the resiliency, this may be done by cutting away the interior of the recesses slightly, as indicated at 14 in Fig. 3, so that less of the ball-surface is in contact with the walls of the recesses. Care should be taken, however, not to cut away the recesses too much, as too much resiliency is not desirable in the wheel. In the best constructions, and as shown, the recesses will be formed in such a way as to lie wholly within the edges of the felly, as recesses formed in this manner do not materially impair the strength of the felly. Further, in the best constructions, and as shown, the outer rim will be formed in such a way that the division or joint between the two sides thereof will occur at about the middle of the tread, a half of each of the recesses 11 being formed in each part of the rim, as the strength of the rim is conserved by this construction.

A metal tire, as indicated at 15, may be employed between the outer tire and the rim for the purposes of additional strength; but care should be taken in putting this tire on not to cause it to bind so tightly as to prevent the ready removal of the parts of rim on one side, thus preventing access to the elastic couplings for the purpose of removal. The opening between the rim and the felly should be left uncovered, as this will enable the spaces between said couplings to be washed out, thus preventing the caking of mud and dirt therein.

Changes and variations may be made in the construction by which the invention is to be carried into effect. The invention is not, therefore, to be limited to the precise construction shown and described.

What is claimed is—

1. In a vehicle-wheel, the combination with a felly, of a rim, these parts being provided with opposed coupling-retaining recesses formed in the felly and rim, a series of substantially solid separate elastic couplings located in the recesses and serving to form the sole connection between the rim and the felly thus permitting the rim to have limited movements with respect to the felly which are controlled by the couplings, the inner circumference of the rim lying so close to the felly that the couplings cannot be removed or forced out between the two.

2. In a vehicle-wheel, the combination with a felly, of a rim spaced therefrom, these parts being provided with opposed coupling-retaining recesses formed in the felly and rim, and one of said parts having a removable portion or portions to permit access to the space therebetween, a series of substantially solid separate elastic couplings located in the recesses and serving to form the sole connection between the rim and the felly, thus permitting the rim to have limited movements with respect to the felly which are controlled by the couplings, the inner circumference of the rim lying so close to the felly that the couplings cannot be removed or forced out from between the two.

3. In a vehicle-wheel, the combination with a felly, of a separable rim independent of the felly, means for detachably holding the parts of the rim together, a series of separate substantially solid elastic couplings between the rim and the felly, said couplings forming the sole connection by which the rim is held to the felly and permitting the rim to have limited movements with respect to the felly which movements are controlled by the couplings, the inner circumference of the rim lying so close to the felly that the couplings can be removed only by separating the parts of the rim.

4. In a vehicle-wheel, the combination with a felly having a series of coupling-retaining recesses therein, said recesses being spaced apart circumferentially of the felly, a separable rim having spaced recesses therein corresponding in position with those in the felly, a series of resilient substantially solid couplings, each coupling being held in position by opposing recesses of the felly and rim and the couplings forming the sole means for connecting the felly and rim, and means for detachably holding the parts of the rim together, the inner circumference of the rim lying so close to the felly that the couplings can only be removed by separating the parts of the rim whereby the rim is permitted to have limited movements with respect to the felly, which movements are controlled by the couplings.

5. In a vehicle-wheel, the combination with a felly having a series of ball-retaining recesses therein, said recesses being spaced apart circumferentially of the felly, an outer rim formed of separable parts, each part being so hollowed out that when the parts are joined, the rim has recesses corresponding in position with the recesses of the felly, a series of resilient balls held in position by the opposing recesses of the felly and rim, and serving to hold the felly and rim together, and means for detachably connecting the parts of the rim.

6. In a vehicle-wheel, the combination with a felly having a series of circumferentially-spaced ball-retaining recesses therein which lie entirely within the edges of the felly, a separable rim, the parts of the rim being hollowed out to form recesses which when the parts of the rim are joined correspond in position with those of the felly, a series of resilient balls held in position by opposing recesses of the felly and rim and serving to hold the rim on the felly, the inner circumference of the rim lying sufficiently close to the circumference of the felly to prevent the removal of the balls except by separating the parts of the rim.

7. In a vehicle-wheel, the combination with a felly having a series of circumferentially-spaced ball-retaining recesses therein which lie entirely within the edges of the felly, means for retaining the felly in position, a separable rim, the parts of the rim being hollowed out to form recesses which when the parts of the rim are joined correspond in position with those of the felly, a series of resilient balls held in position by opposing recesses of the felly and rim and serving to hold the rim on the felly, the inner circumference of the rim lying sufficiently close to the circumference of the felly to prevent the removal of the balls except by separating the parts of the rim.

In testimony whereof I have hereunto set my hand in the presence of two subscribing witnesses.

HARRY BELL.

Witnesses:
    JAMES Q. RICE,
    A. WHITE.